United States Patent [19]

Fey

[11] 4,374,330

[45] Feb. 15, 1983

[54] CONTROL CIRCUIT FOR A PART WHICH IS MOVED IN AN OSCILLATING MANNER BY AN ELECTRIC DRIVE

[76] Inventor: Rainer Fey, Adalbert-Stifter-Strasse 31, D-8720 Schweinfurt, Fed. Rep. of Germany

[21] Appl. No.: 181,742

[22] Filed: Aug. 26, 1980

[30] Foreign Application Priority Data

Sep. 6, 1979 [DE] Fed. Rep. of Germany ....... 2936018

[51] Int. Cl.³ ...................... H01H 47/00; F04B 17/00
[52] U.S. Cl. ................................. 307/132 E; 417/415
[58] Field of Search ................. 307/132; 417/410, 415

[56] References Cited

U.S. PATENT DOCUMENTS 3,836,290 9/1974 Carter .................................. 417/415

Primary Examiner—Donald A. Griffin
Attorney, Agent, or Firm—Toren, McGeady and Stanger

[57] ABSTRACT

The invention relates to a control circuit for a part which is moved in an oscillating manner by an electric drive, particularly for a driving coil of a vibrating piston compressor whose vibrating piston is spring supported.

11 Claims, 6 Drawing Figures

F I G. 4
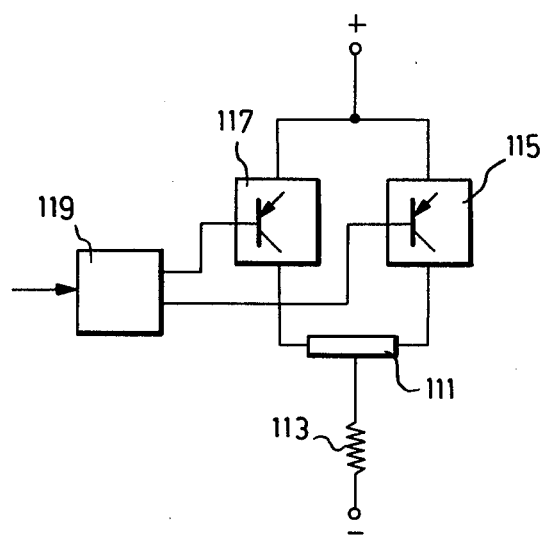
F I G. 5
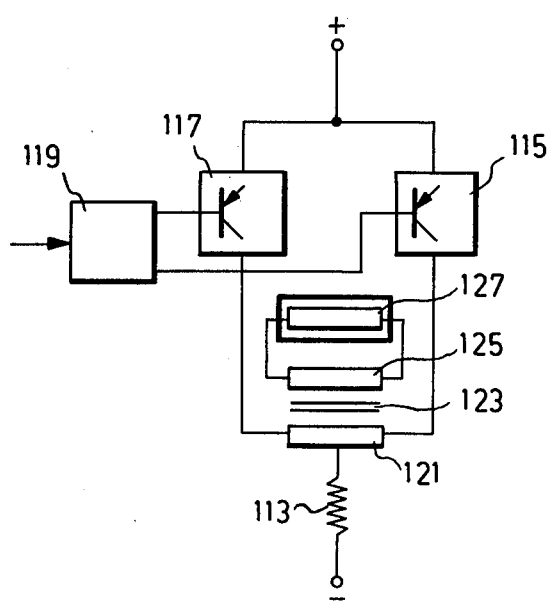

CONTROL CIRCUIT FOR A PART WHICH IS MOVED IN AN OSCILLATING MANNER BY AN ELECTRIC DRIVE

DESCRIPTION OF THE INVENTION

From the German Auslegeschrift 25 14 016, an electric vibration compressor is known in whose cylinder there is axially movably supported a vibration piston. The vibration piston is suspended by springs and is connected to a driving coil which is arranged in the magnetic field of a permanent magnet. The driving current of the driving coil is supplied from a driver stage which, in turn, is periodically switched on and off by an oscillator stage. The frequency of the oscillator stage is selected equal to the natural frequency of the spring/vibration piston/driving coil system.

Vibration compressors of this type are used especially for refrigerators of camping vehicles, boats and other vehicles, so that it is important that the compressor including the corresponding control circuit is as small and lightweight as possible. Furthermore, it is important that the control circuit operates with a high efficiency in order to burden the batteries of the vehicle as little as possible.

The control circuit of the known vibration compressor comprises a frequency matching circuit which adjusts the frequency of the oscillator stage to the natural frequency of the vibrating mechanical system. The known control circuit has the disadvantage that, particularly at the startup of the vibration compressor, the driving current through the driving coil reaches relatively high values which, under unfavorable conditions, can lead to a destruction of semiconductor components. Since the vibration compressor is fed from batteries of the vehicle, the compressor output can strongly vary with the battery voltage. This is particularly true in the case that the vibration compressor is operated over long supply lines which cause a voltage drop at the input of the control circuit which is no longer negligible.

It is the object of the invention to provide a control circuit for a part which is moved in an oscillating manner by an electric drive, particularly for a driving coil of a vibration piston compressor, which operates with a high operating efficiency and is relatively insensitive to variations of the supply voltage.

Starting from a control circuit of the above-explained type, this object is met thereby that a control stage which is connected to a current sensor responding to the driving current switches off the driving current delivered by the driver stage until the beginning of the next driving current phase of the oscillator stage when the driving current exceeds a predetermined value. Such a control stage changes the sensing condition of the pulse vibration given off by the oscillator stage and prevents, at the startup and also in the point of the reversal of the movement of the oscillating part, the driving current from rising above the predetermined value. The control stage further serves as a short circuit protection. The driving current is switched off in the braking phase of the oscillating mechanical system, so that the drive does not counteract the mechanical braking forces of the springs. In this manner, the operating efficiency of the control circuit is substantially increased.

In a preferred embodiment, the oscillator stage has a freely oscillating square pulse generator whose pulses control the driver stage, wherein the control stage preferably is provided with a comparator which is with its first input connected to the current sensor and with its other input to a nominal frequency selector, and with a gate circuit which is controlled by the comparator and is connected between the square pulse generator and the driver stage. In this embodiment, for changing the sensing condition of the oscillator stage, the circuits of the oscillator stage which determine the frequency are not changed. The gate circuit merely shortens the pulses generated by the oscillator stage without a frequency change being effected.

The control stage ensures that, after exceeding the predetermined nominal value, the driving current remains switched off until the next driving current period of the oscillator stage. For this purpose, a timing element controlling the gate circuit could be provided which is set when the driving current exceeds the predetermined nominal value and then blocks the gate circuit for the duration of its time constant. The time constant would have to be dimensioned in such a way that its expiration falls into a pulse gap of the pulse signal of the oscillator stage. However, in such a circuit, the time contant would have to be readjusted when the frequency of the oscillator stage changes. This disadvantage is avoided if, in accordance with a preferred embodiment, it is provided that the oscillator stage has a sawtooth signal generator operating synchronously with the square pulse generator, that the comparator controls a ramp signal generator whose ramp signal changes with a lower rise velocity than the sawtooth signal, and that the sawtooth signal generator and the ramp signal generator are connected only to the inputs of a second comparator which controls the gate circuit. The ramp signal generator delivers a ramp signal as soon as the driving current sensed by the current sensor exceeds the predetermined threshold value. The second comparator compares this ramp signal to the sawtooth signal whose frequency is equal to the frequency of the oscillator stage. Since the sawtooth signal generator generates in any driving current period of the oscillator stage only one sawtooth pulse, the gate circuit remains switched off until the sawtooth signal once again reaches the switch-on conditions of the next driving current. In its simplest embodiment, the ramp signal generator is composed of a capacitor which is connected to the output of the first comparator. The polarity of the output signal of the first comparator is preferably chosen in such a way that the capacitor is charged by the output signal of this comparator when the driving current is below the predetermined nominal value and is discharged when the driving current exceeds this nominal value.

For exciting the oscillating vibration of the part moved in an oscillating manner, a drive is sufficient which is capable of applying a driving force only in one direction. Since a drive of this type would require relatively high driving currents, drives are preferred which are capable of applying driving forces in both directions of movement of the oscillating part. A preferred embodiment of this type is characterized in that the drive is constructed as a driving coil and the driver stage as a push-pull driver stage, and that the control stage has a flip-flop which can be switched by the pulses of the square pulse generator, the outputs of the flip-flop being connected over a coincidence gage each of the gate circuit to switch stages of the push-pull driver stage.

To ensure that the driving current of one direction of movement is safely switched off when the driving current flows in the other direction of movement, it is preferably provided that the square pulse generator generates pulses whose pulse generation is shorter than the duration of time pulse gaps, and that the coincidence gate is connected with a first input to one of the outputs of the flip-flop and with a second input to the square pulse generator and which can be controlled through a third input by means of the comparator. Such a control stage delivers pulse sequences which are staggered by 180° and whose pulses have a safety spacing with respect to time The push-pull driver stage requires only two switch stages for switching the driving currents of the directions of movement when the driving coil has a center tap. The push-pull driver stage alternately switches the two coil halves.

In the above-explained embodiment of the driving coil with center tap, each of the two coil halves must apply the desired driving force. The number of windings of the coil can be reduced in half compared to this embodiment when the push-pull driver stage is constructed as a bridge circuit whose bridge arms each have a switch stage, wherein the driving coil is connected to a bridge diagonal and the switch stage connected to opposite sides of this bridge diagonal can be simultaneously switched on and off through the control stage.

The switching frequency of the driver stage should be slightly above the natural frequency of the part which is moved in an oscillating manner. In vibration compressors, it may happen that the natural frequency changes in dependence on the pressure against which the compressor must operate. The natural frequency is frequently lower when the compressor must operate against a low pressure at the startup and the natural frequency increases with increasing pressure. To take this into account, it is preferably provided that the oscillator stage is constructed as a sweep oscillator stage whose sweep frequency is determined by a capacitor, and the the collector-emitter section of a transistor is connected in parallel with the capacitor, the basis of the transistor being connected to a differentiating element to an operating voltage source of the oscillator stage. When the device is switched on, the differentiating element produces a pulse with exponential trailing edge which changes the collector current or the resistance parallel to the capacitor formed by the transistor. This change in resistance leads to a change of the charging or discharging time constant of the capacitor and changes the sweep frequency when switching on the device. After the initial pulses have subsided, the oscillator stage vibrates with the predetermined, preferably adjustable, sweep frequency.

In the following, embodiments of the invention shall be explained in detail with the aid of the drawing. In the drawing:

FIGS. 4 to 6 show modifications of a driver circuit used in the circuit according to FIG. 2.

Figure 1:
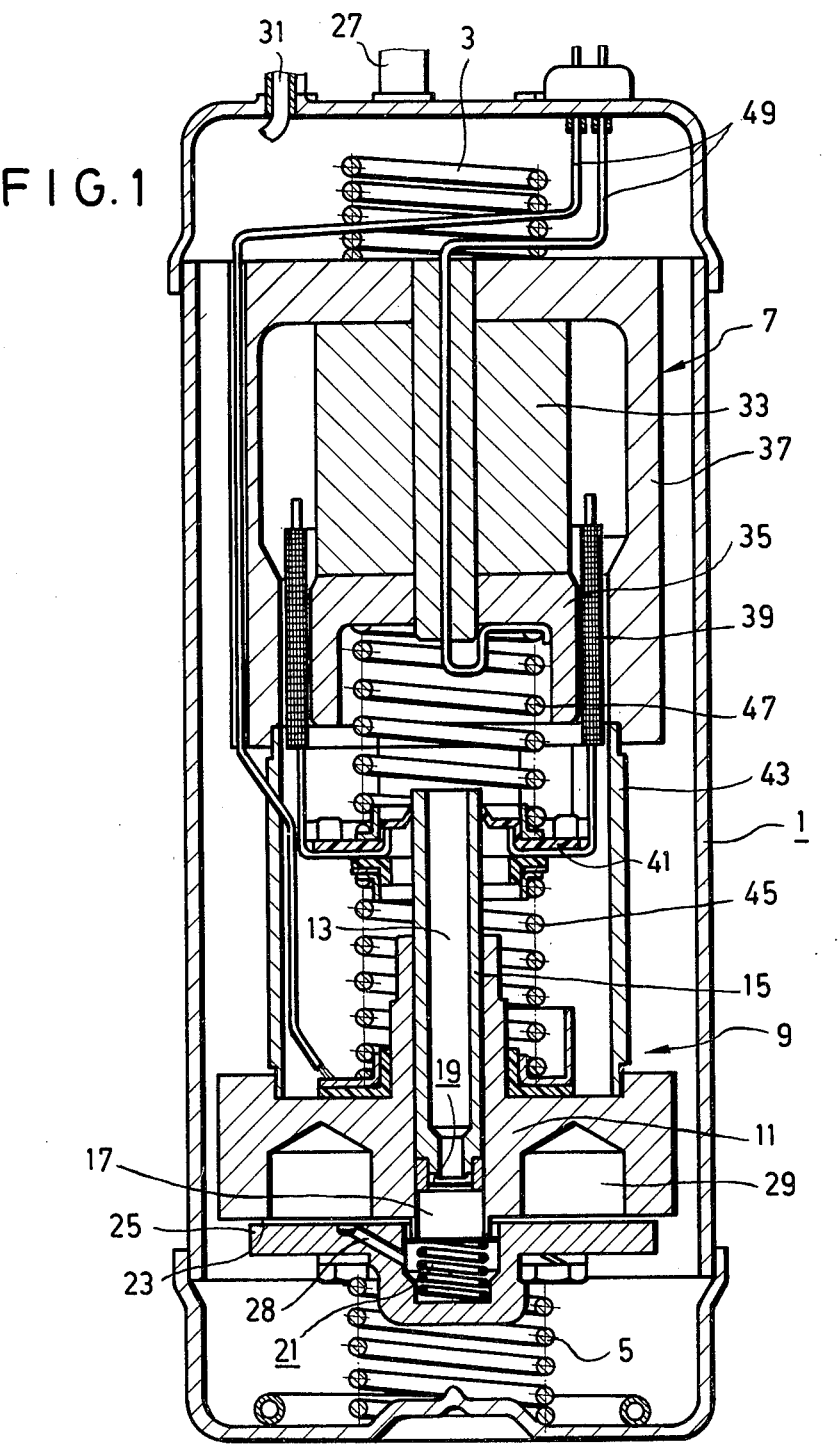
FIG. 1 is a longitudinal section taken through a vibration compressor.

The vibration compressor illustrated in FIG. 1 for a battery-operated refrigerator of a vehicle comprises a refrigerant-tight housing 1 in which a piston-cylinder unit 9 is suspended in a vibration damping manner between two damping springs 3,5, the piston-cylinder unit 9 being rigidly connected to a driving unit 7. The piston-cylinder unit 9 comprises a cylinder 11 in which a piston 15 provided with a continuous longitudinal bore 13 is movably guided. The end face of the piston 15 facing a compression chamber 17 in the cylinder 11 carries an inlet valve 19 constructed as a check valve. The end face of the cylinder 11 facing away from the piston 15 forms the seat of a prestressed outlet valve 21 whose spring rests on a cover 25 which is sealed from the cylinder 11 at 23. The refrigerant to be compressed is introduced through a supply line 27 into the housing 1 from where it reaches the compression chamber 17 through the longitudinal bore 13 and the inlet valve 19. Through the outlet valve 21 and at least one connecting channel 28 in the cover 25, the refrigerant of the refrigerator-refrigerant cycle compressed in the compression chamber 17 reaches an annular space 29 of the cylinder body, which in a manner not illustrated in detail, is in communication with a discharge line 31.

The driving unit 7 comprises an axially magnetized permanent magnet 33 whose pole shoes 35,37 form an annular gap which is coaxial to the piston 15. Immersed without contact in the annular gap is a driving coil 39 which is fastened to the piston 15 through a support flange 41 of insulating material. A spacer sleeve 43 connects the pole shoe 37 to the cylinder 11. Between the support flange 41 and the pole shoe 35, on the one hand, and the support flange 41 and the cylinder 11, on the other hand, compression springs 45 or 47, respectively, are mounted which keep the piston 15 in equilibrium in a middle position. The compression springs are insulated relative to one another and are connected to the connections of the driving coil 39, on the one hand, and the connecting lines 49, on the other hand. Together with the compression springs 45,47, the piston 15 forms a system which is capable of vibration, the oscillating vibrations being imparted to the system by current pulses which are supplied to the driving coil 39. The frequency of the driving pulses is preferably somewhat greater than the natural frequency of the vibrating system.

Figure 2:
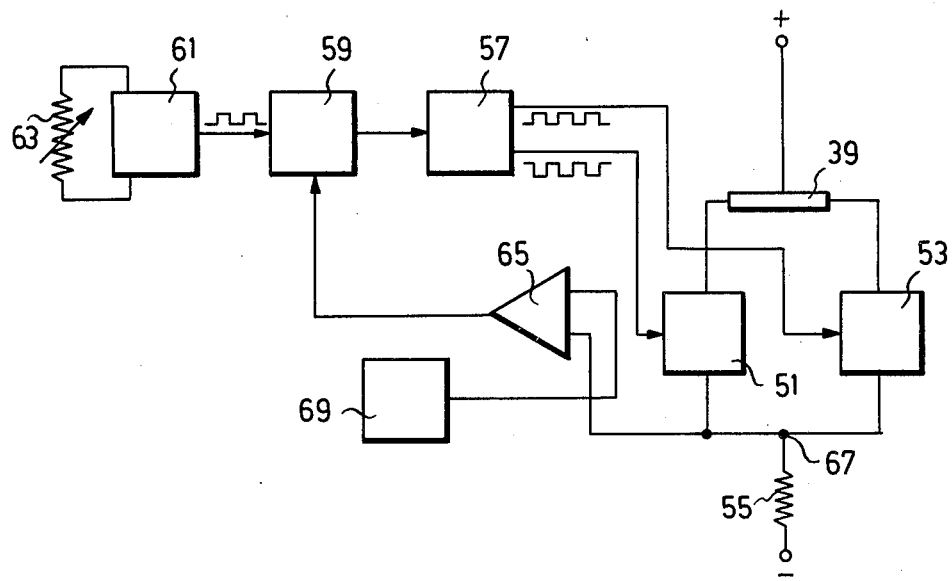
FIG. 2 is a block diagram of a control circuit of the vibration compressor according to FIG. 1.

FIG. 2 shows a control circuit for generating driving current pulses for a vibration compressor of the type illustrated in FIG. 1. The driving coil 39 is divided by a center tap into two coil halves which are wound in the same direction and are connected in parallel to a switch stage 41 and 43 each. The center tap of the driving coil 39 is connected to the plus pole of a direct current voltage source, for example, a vehicle battery, while the connection point of the two switch stages 51,53 is connected to the negative pole of the voltage source via a joint current sensor resistor having a very low resistance value. The switch stages 51,53 are alternately switched on by a push-pull control stage 57, so that the two coil halves of the driving coil 39 conduct current alternately. Since the coil halves are wound in the same direction, the driving coil 39 produces magnetic fields which are alternately directed in opposite directions, these magnetic fields being superimposed on the magnetic field of the permanent magent 33 (FIG. 1) and leading to a periodically oscillating movement of the driving coil 39, and, thus, of the piston 15.

The push-pull control stage 57 produces the pulses supplied to the switch stages 51,53 from a sequency of square pulses which are delivered from a square pulse generator 61 through a gate circuit 59. The pulse frequency of the generator 61 can be adjusted to the natural frequency of the spring-piston system by means of an adjusting element 63. At the latest, the gate circuit 59 closes when the leading edge of the pulses of the generator 61 occurs. The gate circuit 59 is controlled by a comparator 65 which blocks the gate circuit 59 when the potential at the connecting point 67 of the current sensor resistor 55 with the switch stages 51,53 exceeds a value which is predetermined by means of a reference voltage source 69. The gate circuit 59 is constructed in such a way that it remains in the blocked state until the next pulse of the generator 61 occurs. If the current through the driving coil 39 and the switch stages 51,53 rises, for example, at the startup of the vibration compressor or at the reversal of the movement of the piston 15, beyond the value determined by the reference voltage source 69, the switch stage 51 or 53 which is conductive at the movement will be blocked until the next pulse of the generator 61 will switch on the respectively other switch stage.

Figure 3:
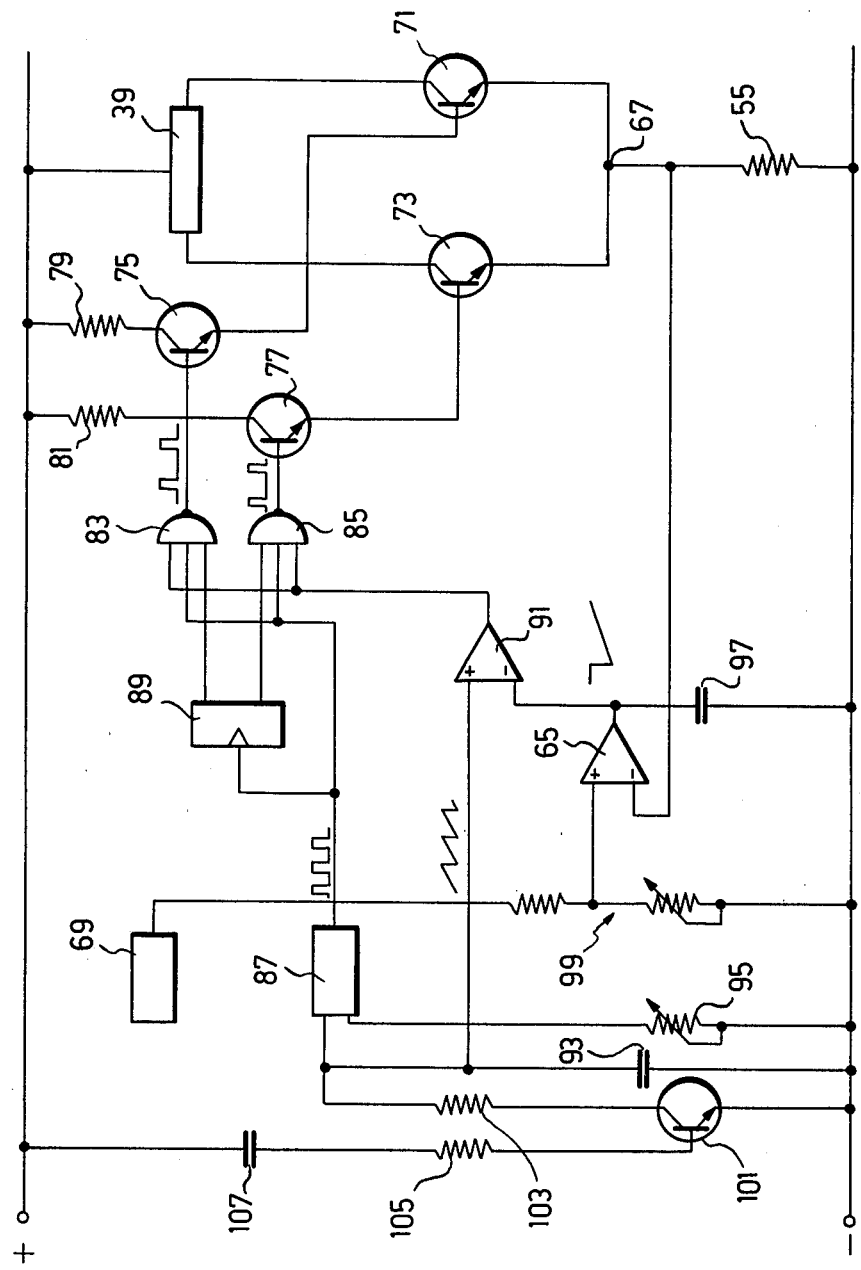
FIG. 3 is a diagram with details of the block diagram according to FIG. 2.

FIG. 3 shows details of the circuit according to FIG. 2, wherein equal parts are denoted by the same reference numeral. The driving coil 39 again comprises a center tap. The two coil halves of the driving coil 39 are connected to the connecting point 67 with the current sensor resistor 55 through the collector-emitter section of a power transistor 71 or 73, respectively. To the bases of each power transistor 71,73 there is connected the emitter of a control transistor 75 or 77 whose collector is connected to the positive connection of the operating voltage source via a resistor 79 or 81. The transistors are npn transistors which, always in pairs, form the switch stages 51 and 53.

The bases of the switching transistors 75 and 77 are connected to the outputs of NAND gates 83 and 85, respectively. Each of the NAND gates 83 or 85 has three inputs, the first of which inputs is connected to a square pulse generator 87, the second to one of two complementary outputs of a flip-flop 89 and the third to the output of a comparator 91. The flip-flop 89 has a dynamic input which is also connected to the square pulse generator 87, so that the flip-flop 89 is switched over by the leading edge of each pulse. Accordingly, the NAND gates 83,85 alternately deliver pulses with half the frequency of the square pulse generator 87, the pulses being in 180° phase relative to one another. Since the pulse widths of the pulses of the square pulse generator 87 is smaller than the duration of the gaps between these pulses, the pulses of the NAND gates 83 and 85 do not overlap. As a result, it is ensured that always only one of the two power transistors 71 or 73 is switched on.

The circuit determining the pulse frequency of the square pulse generator 87 comprises a capacitor 93 and a variable resistor 95. The capacitor 93 is part of a sawtooth generator whose sawtooth rise speed is determined by the capacity of the capacitor 93 and the resistance value of the variable resistor 95. The sawtooth signal is supplied to the non-inverting input of the comparator 91 whose inverting input is connected to the output of the comparator 65. A capacitor 97 is connected between the output of the comparator 65 and negative pole of the operating voltage source. While the inverting input of the comparator 65 is connected to the connecting point 67, the non-inverting input is connected to the reference voltage source 69 through an adjustable voltage dividing circuit 99. In connection with the comparator 65, the capacitor 97 forms a ramp signal generator. The capacitor 97 is charged as long as the potential of the connecting point 69 is smaller than the potential of the voltage divider 99, wherein the rise speed with which the capacitor voltage increases is smaller than the rise speed of the sawtooth signal at the capacitor 93. The capacitor is discharged when the current rises through the respectively switched-on power transistor 71 or 73 beyond the value determined by the adjustment of the voltage divider 99. Subsequently, the comparator 91 blocks both NAND gates 83 and 85 until the ramp signal of the comparator 65 has grown above the value of the sawtooth signal. This condition is reached within the pulse gap or at the beginning of the next pulse delivered by the square pulse generator 87.

The voltage drop at the current sensor resistor 55 can be kept very small when the comparator 65 switches already at a very low voltage threshold. The supply voltage of the comparators 65 and 91 is preferably also delivered from the reference voltage source 69, which may be a conventional control circuit. The supply voltage connections of the remaining circuit elements, particularly the square pulse generator 87, the NAND gates 83 and 85 and the flip-flop 89, can be connected directly to the operating voltage source. To achieve a relatively compact structure of the circuit, preferably integrated circuits are used. For example, the integrated circuit SG 3524 of Texas Instruments is suitable.

At the startup of the vibration compressor, the compressor must usually first build up its initial pressure since this pressure had dropped during the stop in operation. The changed pressure conditions at the output of the vibration compressor usually change the natural frequency of the oscillating system. To take this into account, the collector-emitter section of a transistor 101 in series with a resistor 103 is connected in parallel to the capacitor 93 which determines the frequency. Accordingly, depending on the control of the transistor 101, the parallel resistance of the capacitor 93 and, thus, the pulse frequency of the square pulse generator 87 can be controlled. The base of the transistor 101 is connected to the positive pole of the operating voltage source through the series connection of a resistor 105 and a capacitor 106. The capacitor 107 and the resistor 105 form a differentiating element which, at the startup of the device, supplies to the base of the transistor 101 a current pulse with exponentially decreasing trailing edge. The circuit is arranged in such a way that, at the startup, the frequency of the square pulse generator 87 is reduced by the current pulse and then gradually rises to the value adjusted at the resistor 95.

FIG. 4 shows another embodiment of a driver stage for a driving coil 111 which corresponds to the driving coil 39. The driving coil 111 again has a center tap which is connected through a current sensor resistor 113 to the negative pole of the operating voltage source. The two coil halves of the driving coil 111 are connected in parallel to the positive pole of the operating voltage source through a switch stage 115 or 117. The switch stages 115,117 differ from the switch stages 51 and 53 of FIG. 2 essentially only in that they are constructed with the use of pnp transistors. The switch stages 115,117 are again alternately blocked and alternately switched by a stage 119 which corresponds to the push-pull control stage 57.

FIG. 5 shows the diagram of a modification of the driver circuit according to FIG. 4 which differs from the latter circuit essentially in that the driving coil 111 is replaced by the primary winding 121 of an insulating transformer 123 which also has a center tap, the secondary winding 125 of the transformer 123 being connected to a driving coil 127. The isolating transformer 123 galvanically separates the driving coil 127 from the operating voltage source which is especially advantageous in embodiments of the vibration compressor in which the housing 1 is connected to a pole of the operating voltage source. Furthermore, when the isolating transformer 123 is used, the center tap of the driving coil is unnecessary.

Figure 6:
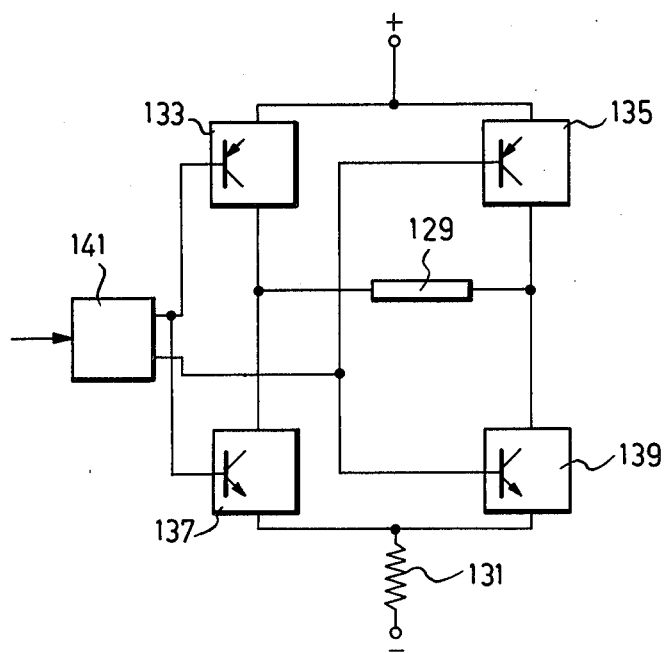

FIG. 6 shows another modification of a driver circuit in which it is also possible to use a driving coil 129 without center tap. The driving coil 129 is connected to a diagonal arm of a bridge circuit whose other diagonal arm is connected in series with a current sensor resistor 131 corresponding to current sensor resistor 55 to the operating voltage source. The bridge arms of the bridge are formed by switch stages 133,135,137 and 139. In accordance with the potential diagram of the bridge circuit, the switch stages 133,135 connected to the positive pole of the operating voltage source are constructed with the use of pnp-transistors, while the switch stages 137 and 139 connected to the current sensor resistor 131 are constructed with the use of npn-transistors. The switch stages 133 to 139 are controlled by push-pull control circuit 141, wherein the switch stages 133 and 137 are connected to an output of the push-pull control stage 141, while the switch stages 135 and 139 are connected to the other output. Accordingly, the complementary output signals of the push-pull control stage 144 alternately block either the switch stages 133 and 139 jointly or the switch stages 135 and 139 jointly, while the switch stages which are not blocked are switched through. The direction of current in the driving coil 29 can be reversed by means of the bridge circuit.

I claim:

1. Control circuit for a part which is movable in an oscillating manner by an electric drive, particularly for a driving coil 39; 111; 125; 129 of a vibration piston compressor, whose vibration piston is spring-mounted, with an oscillator stage 61; 87 and a driver stage 51, 53, 57; 71,73,75, 77, 89 controlled by said oscillator stage 61; 87 and periodically switching on or off the driving current of the drive and with a current sensor responding to the driving current wherein the frequency of the oscillator stage is selected in such a way that the switching frequency of the driver stage is approximately equal to the natural frequency of said oscillating part, characterized in that a control stage 55,65,59; 55,65,91,83,85,89 which is connected to a current sensor 55;113; 131 responding to the driving current switches off the current delivered by said driver stage until the start of the next driving current phase of said oscillator stage when the driving current exceeds a predetermined value.

2. Control circuit according to claim 1, characterized in that said oscillator stage has a freely oscillating square pulse generator 61; 87 whose pulses control the driver stage 51,53,57; 71,73,75,77,89, and that said control stage 55,65,59; 55,65,91,83,85,89 has a comparator 65 which with its one input is connected to said current sensor 55 and with its input to a nominal frequency selector 69,99 and a gate circuit 59; 83,85 which is controlled by said comparator 65 and is connected between said square pulse generator and said driver stage.

3. Control circuit according to claim 2, characterized in that said oscillator stage has a sawtooth signal generator 93 which operates synchronously with said square pulse generator 87, that said comparator 65 controls a ramp signal generator 97 whose ramp signal changes with lower rise speed than the sawtooth signal, and that said sawtooth signal generator 93 and said ramp signal generator 97 are connected to the inputs of a second comparator 91 which controls said gate circuit 83,85.

4. Control circuit according to claim 3, characterized in that said ramp signal generator has a capacitor connected to the output of said first comparator.

5. Control circuit according to claim 2, characterized in that the drive is constructed as driver coil 30; 111; 125; 129 and said driver stage is constructed as push-pull driver stage 51,53,57; 71,73,75,77,89, and that said control stage 83,85,89 has a flip-flop 89 which can be switched by the pulses of said square pulse generator 87, the outputs of said flip-flop 89 being connected through a coincidence gate 83,85 each of said gate circuit to switch stages 71,75 or 73,77 of said push-pull driver stage.

6. Control circuit according to claim 5, characterized in that said square pulse generator 87 generates pulses whose pulse duration is shorter than the duration of the pulse gaps, and that said coincidence gates 83,85 are connected with a first input to one of the outputs of said flip-flop 89 and with a second input to said square pulse generator 87 and can be controlled through a third input by means of said comparator 65.

7. Control circuit according to claim 5, characterized in that said driving coil 39; 111 has a center tap.

8. Control circuit according to claim 5, characterized in that said push-pull driver stage is constructed as a bridge circuit whose bridge arms each have a switch stage 133-139, that said driver coil 129 connected to a bridge diagonal, and that the switch stages 133,139 or 135,139 respectively connected to opposite sides of said bridge diagonal can be simultaneously switched on or off through said control stage 141.

9. Control circuit according to claim 5, characterized in that said driver coil 127 is connected to said driver stage 115, 117 through an insulating transformer 123.

10. Control circuit according to claim 1, characterized in that said oscillator stage 87 is constructed as a sweep oscillator stage whose sweep frequency is determined by a capacitor 93, and that connected in parallel with said capacitor 93 is the collector-emitter section of a transistor 101 whose base is connected to an operating voltage source of said oscillator stage 87 through a differentiating element 105,107.

11. Control circuit according to claim 1, characterized in that the frequency of said oscillator stage is chosen in such a way that the switching frequency of said driver stage is higher than the natural frequency of said oscillating part.

* * * * *